Dec. 17, 1957 W. F. BECKER 2,816,369
COMBINATION LEVEL AND RULE FOR
PLUMBERS AND PIPE FITTERS
Filed Oct. 2, 1956
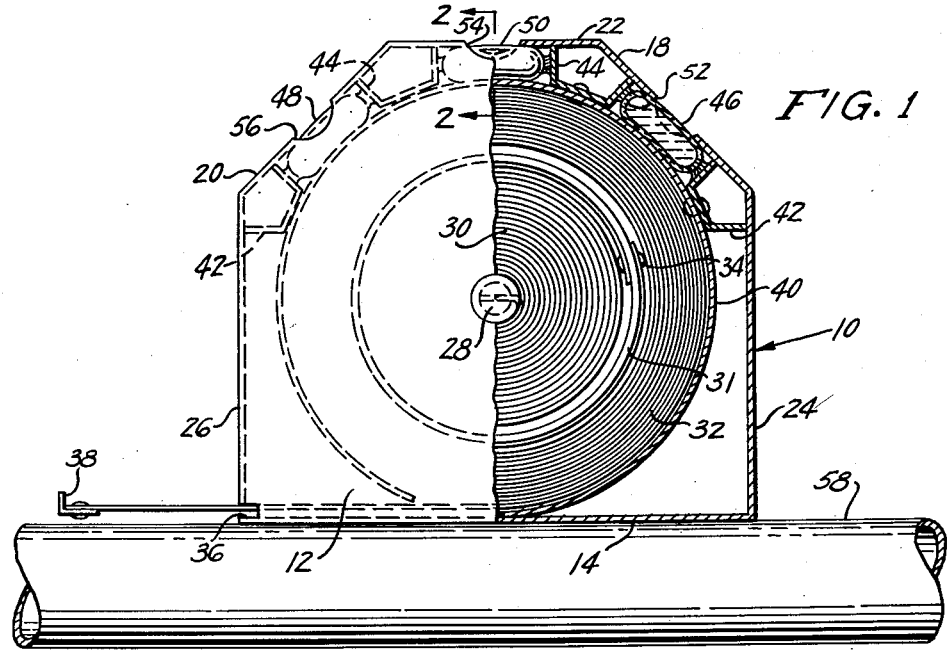
FIG. 1
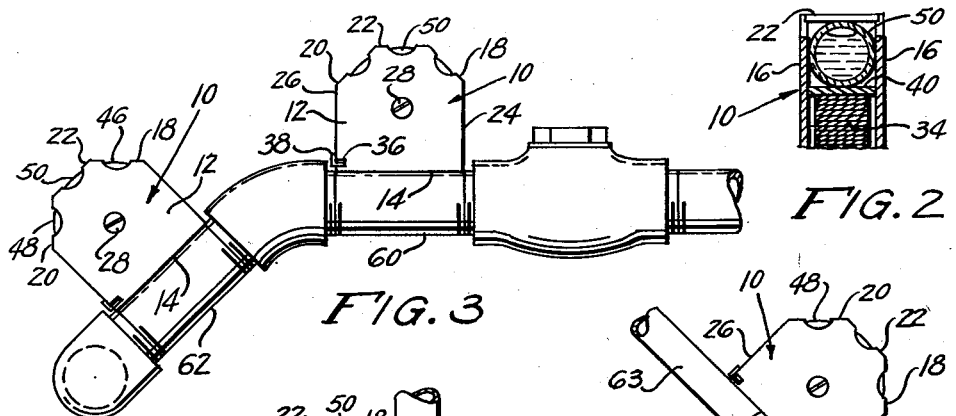
FIG. 2
FIG. 3
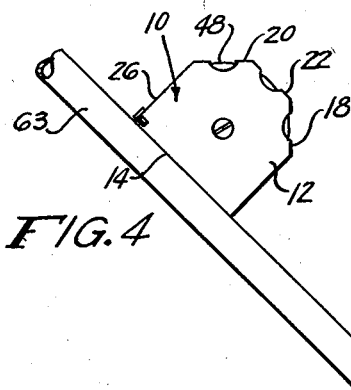
FIG. 4
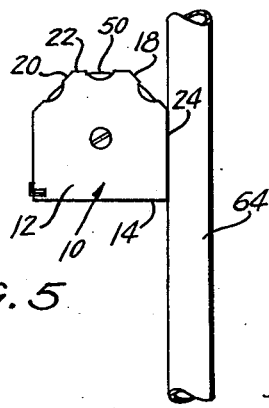
FIG. 5
INVENTOR.
WILLIAM F. BECKER
BY
McMorrow, Berman + Davidson
ATTORNEYS United States Patent Office 2,816,369
Patented Dec. 17, 1957

2,816,369

COMBINATION LEVEL AND RULE FOR PLUMBERS AND PIPE FITTERS

William F. Becker, Whitehorse, Yukon Territory, Canada

Application October 2, 1956, Serial No. 613,478

4 Claims. (Cl. 33—211)

This invention relates to a combination tool adapted particularly for use by plumbers and pipe fitters, the tool being so designed as to permit measurements to be made whenever desired, and being further designed to permit, with maximum speed and ease, the checking of piping for determining whether it is in a properly horizontal, vertical, or 45 degree position, as the case may be.

In the plumbing and pipe fitting trades, piping is installed either horizontally, vertically, at an inclination of 45 degrees, or at an opposite inclination of 45 degrees.

A plumber or pipe fitter must regularly use a steel rule, of the type in which the flexible rule is wound within a small, generally rectangular case. Further, it is necessary to continuously check the installed piping to determine whether it is level, plumb, or at the desired 45 degree angle.

An ordinary level is not needed by a plumber, since the pipe itself provides a straight edge. In fact, an ordinary level, being generally elongated, often cannot be used to advantage in view of the fact that the checking must in some instances be done in areas of the piping against which a level cannot be placed. For example, such an area might be over the length of a short nipple, connected between an elbow and a valve. The projection of the elbow and valve outwardly from the normal diameter of the nipple or piping prevents the level from being placed directly against the nipple or short length of pipe.

The main object of the invention, accordingly, is to provide a combined level and rule which is particularly usable to advantage by plumbers and pipe fitters, although, of course, it may have other uses.

A more specific object is to provide a single, compact rule that can be carried in the pocket as a device which will permit measurements to be taken, and which will also permit checking, even in relatively inaccessible places, of the pipe to determine whether it is horizontal, vertical, or at the proper 45 degree angle of inclination.

Still another object is to provide a tool of the character described which will be so designed that the level means incorporated therein will not interfere with the use of the tools during the taking of measurements, and vice versa.

Still another object is to provide a combination tool of the character stated that will be adapted for manufacture at a cost little greater than that required for the manufacture of conventional flexible steel rule.

A further object is to incorporate in the case of the rule a plurality of bubble tubes mounted in angularly related surfaces of the casing to permit use of one bubble tube for measurement of a pipe to determine if it is horizontal or vertical as the case may be, another bubble tube for checking a pipe for a proper 45 degree inclination to the left, and another bubble tube for checking a pipe for a proper 45 degree inclination to the right, each of the bubble tubes being formed in surfaces having a particular bottom surface of the case of the device, that is, an intermediate tube disposed in a surface parallel to the bottom surface of the case, another bubble tube is disposed in a surface at a 45 degree angle to the bottom of the case, and a third bubble tube also disposed at a 45 degree angle to the bottom surface of the case, though in an opposite direction to the first named 45 degree surface.

Other objects will appear from the following description, the claims appended thereto, and from the annexed drawing, in which like reference characters designate like parts throughout the several views, and wherein:

Figure 1 is a view partly in vertical section and partly in elevation of a combination tool formed according to the present invention, applied to a horizontally disposed length of pipe;

Figure 2 is a sectional view on line 2—2 of Figure 1;

Figure 3 is an elevational view showing the application of the tool to horizontal and 45 degree lengths of pipe, with the tool being used on short nipples, that is, in relatively inaccessible locations in which an ordinary level cannot be employed;

Figure 4 is an elevational view of the tool applied to a pipe disposed at a 45 degree angle oppositely to that shown at the left of Figure 3; and Figure 5 is an elevational view showing the tool applied to a vertically disposed pipe.

Referring to the drawings in detail, the tool constituting the present invention has been generally designated 10, and includes a case 12 having a flat bottom wall 14, vertical side walls 16, and a top wall having one end portion 18 disposed at a 45 degree angle to the plane of bottom wall 14, an opposite end portion 20 also disposed in a plane at 45 degrees to the bottom wall 14 though oppositely to the inclination of end portion 18, and an intermediate portion 22 lying in a plane parallel to that of the bottom wall 14. Back and front walls 24, 26 lie in planes normal both to the plane of the bottom wall 14 and side walls 16.

Extending between the walls 16, substantially centrally of the device, is a pin 28, and anchored at one end to the pin is a winding spring 30, the other end of which is connected to a drum 31. Connected to the outer surface of the drum is a flexible steel rule member 32, which is connected to the drum by a rivet 34 or the like. The rule 32 has its outermost convolution extended through a slot 36 formed in the front wall 26 adjacent the intersection of the front wall with the bottom wall 14, the projecting end of the rule member being formed with a lip 38 in the usual manner.

The outermost convolution of the rule member 32 is guided by an arcuate guide plate 40 fixedly secured within the case. The guide plate 40 extends in spaced relation to the portions 18, 20, 22, of the top wall, these being symmetrically arranged in relation to the guide plate 40 as shown in Figure 1.

Fixedly connected between the arcuate guide plate 40 and the several portions of the top wall are spacer members 42 each of approximate U-shape. Spacer members 42 are disposed at the outer ends of the end portions 18, 20, with the bight parts of the spacers 42 being connected to the guide plates 40.

Intermediate spacers 44 are formed similarly to the spacers 42, one end of the spacers 44 being connected between the guide plate 40 and the adjoining ends of the portions 18, 22. The other ends of spacers 44 are similarly connected between the adjoining ends of the portions 20, 22.

A bubble tube 46 is mounted in the space between one of the spacers 42 and the adjacent spacer 44, being fixedly connected at its ends to the adjacent walls of the spacers. Bubble tube 46 is extended in parallel relation to the wall portion 18. A second bubble tube 48 is similarly mounted between the other spacer 42 and other spacer 44, in parallelism with and adjacent the plane of end portion 20. An intermediate bubble tube 50 is similarly mounted between the intermediate spacers 44 adjacent the wall portion 22. The bubble tubes are visible through openings 52, 54, 56, of portions 18, 22, 20, respectively.

In Figure 1, the device has been applied to a horizontal pipe 58. Bottom wall 14 is flat against the pipe. The tube 50 may now be observed to determine if the pipe is perfectly horizontal since wall portion 22 is parallel to the bottom wall 14.

In Fig. 3, the device 10 at the right has been applied to a short nipple little greater in length than the device itself. The case engages flat against the nipple between an elbow and a valve to which the nipple is connected. The nipple 60 is checked for horizontality in the same manner as pipe 58.

Also in Figure 3, a combination rule and level are applied to a nipple 62 disposed at an angle of 45 degrees. The bottom wall 14 is flat against the nipple and the reading in this instance is taken from tube 46, since wall portion 18 will be horizontal if the pipe is inclined properly, at the desired angle of 45 degrees.

In Figure 4, the device is used to check a 45 degree inclination of a pipe 63, which inclination is opposite to that of the nipple 62. In this instance, the bubble tube 48 is observed, since wall portion 20 is horizontally disposed.

In Figure 5, a pipe 34 is checked to determine if it is plumb. The back wall 24, since it is in a plane perpendicular to those of the bottom wall 14 and wall portion 22, is disposed flat against the pipe, so that wall portion 22 is horizontal and bubble tube 50 may be observed.

It will be seen that the device has characteristics making the same very desirable for use by plumbers although, of course, it can be used also to considerable advantage by persons engaged in other trades, as well as by the ordinary householder. The highly compact construction permits the device to be carried in one's pocket, so that it will be conveniently accessible at all times. Further, the device is so designed that the walls engageable against the work will generally be no more than two inches, more or less, in length. This allows the device to be placed against short length pipes, nipples, etc., a decidedly important feature in the plumbing and allied trades.

Still, further, the construction provides for a reinforcement of the guide 40 by the spacers 42, 44 connected between the guide and the angularly related wall portions in position to define bubble tube chambers in which the bubble tubes may be snugly fitted in engagement with the guide 40, wall portions 18, 20, 22, the spacers, and the side walls 16.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, and the means presently devised to carry out said principles, it being considered that the invention comprehends any minor change in construction that may be permitted within the scope of the appended claims.

What is claimed is:

1. In a device of the class described, a case including a bottom wall, a front wall, and a back wall, the back wall lying in a plane normal to that of the bottom wall, and a top wall connected between the front and back walls and divided into an intermediate portion lying in a plane parallel to that of the bottom wall and end portions lying in oppositely inclined planes each disposed at an angle of 45 degrees to that of the bottom wall, said portions respectively having sight openings formed therein; a plurality of bubble tubes mounted in the case in positions paralleling the planes of the respective top wall portions, said tubes being disposed for viewing thereof through the sight openings; and an arcuate wall mounted in the case and extending in closely spaced relation to the several top wall portions, said bubble tubes extending in longitudinally contacting relation to the arcuate wall and the respective wall portions, in the space therebetween.

2. In a device of the class described, a case including a bottom wall, a front wall, and a back wall, the back wall lying in a plane normal to that of the bottom wall, and a top wall connected between the front and back walls and divided into an intermediate portion lying in a plane parallel to that of the bottom wall and end portions lying in oppositely inclined planes each disposed at an angle of 45 degrees to that of the bottom wall, said portions respectively having sight openings formed therein; a plurality of bubble tubes mounted in the case in positions paralleling the planes of the respective top wall portions, said tubes being disposed for viewing thereof through the sight openings; an arcuate wall mounted in the case and extending in closely spaced relation to the several top wall portions, said bubble tubes extending in longitudinally contacting relation to the arcuate wall and the respective wall portions, in the space therebetween; and spacers extending between the arcuate wall and said wall portions in alternating relation to the bubble tubes, thus to cooperate with the arcuate wall and the several wall portions in forming chambers for the bubble tubes.

3. In a device of the class described, a case including a bottom wall, a front wall, and a back wall, the back wall lying in a plane normal to that of the bottom wall, and a top wall connected between the front and back walls and divided into an intermediate portion lying in a plane parallel to that of the bottom wall and end portions lying in oppositely inclined planes each disposed at an angle of 45 degrees to that of the bottom wall, said portions respectively having sight openings formed therein; a plurality of bubble tubes mounted in the case in positions paralleling the planes of the respective top wall portions, said tubes being disposed for viewing thereof through the sight openings; an arcuate wall mounted in the case and extending in closely spaced relation to the several top wall portions, said bubble tubes extending in longitudinally contacting relation to the arcuate wall and the respective wall portions, in the space therebetween; and spacers extending between the arcuate wall and said wall portions in alternating relation to the bubble tubes, thus to cooperate with the arcuate wall and the several wall portions in forming chambers for the bubble tubes, said spacers and wall portions being symmetrically arranged in respect to the curvature of the arcuate wall.

4. In a device of the class described, a case including a bottom wall, a front wall, and a back wall, the back wall lying in a plane normal to that of the bottom wall, and a top wall connected between the front and back walls and divided into an intermediate portion lying in a plane parallel to that of the bottom wall and end portions lying in oppositely inclined planes each disposed at an angle of 45 degrees to that of the bottom wall, said portions respectively having sight openings formed therein; a plurality of bubble tubes mounted in the case in positions paralleling the planes of the respective top wall portions, said tubes being disposed for viewing thereof through the sight openings, an arcuate wall mounted in the case and extending in closely spaced relation to the several top wall portions, said bubble tubes extending in longitudinally contacting relation to the arcuate wall and the respective wall portions, in the space therebetween; and spacers extending between the arcuate wall and said wall portions in alternating relation to the bubble tubes, thus to cooperate with the arcuate wall and the several wall portions in forming chambers for the bubble tubes, said spacers and wall portions being symmetrically arranged in respect to the curvature of the arcuate wall, the spacers including a pair of end spacers extending between the arcuate wall and the outer ends of the end portions of the top wall and a pair of intermediate spacers extending between the arcuate wall and the adjoining ends of the intermediate and end portions of the top wall.

References Cited in the file of this patent

UNITED STATES PATENTS

| 642,888 | Van Vliet | Feb. 6, 1900 |
| 1,422,231 | Stanley | July 11, 1922 |

FOREIGN PATENTS

| 94,115 | Sweden | Jan. 9, 1939 |